(12) United States Patent
Brodie et al.

(10) Patent No.: US 7,257,246 B1
(45) Date of Patent: Aug. 14, 2007

(54) CHECK CASHING SYSTEMS AND METHODS

(75) Inventors: Alan S. Brodie, Clearwater, FL (US);
Thomas R. Cwik, Riverview, FL (US);
Alan V. Fisher, Riverview, FL (US);
Stephen M. Kuzio, Clearwater, FL (US)

(73) Assignee: Certegy Check Transaction Service, Inc., Alpharetta, GA (US)

( * ) Notice: Subject to any disclaimer, the term of this patent is extended or adjusted under 35 U.S.C. 154(b) by 743 days.

(21) Appl. No.: 10/431,156

(22) Filed: May 7, 2003

Related U.S. Application Data (60) Provisional application No. 60/378,469, filed on May 7, 2002.

(51) Int. Cl.
*G06K 9/00* (2006.01)
*G06Q 40/00* (2006.01)
(52) U.S. Cl. .................. 382/137; 382/119; 705/39; 705/40; 705/42
(58) Field of Classification Search ............... 382/137, 382/119; 705/35, 42, 39; 902/4–6
See application file for complete search history.

(56) References Cited

U.S. PATENT DOCUMENTS

| | | | |
|---|---|---|---|
| 3,212,062 A | 10/1965 | Goldman et al. | 340/172.5 |
| 3,801,774 A | 4/1974 | Michaelis et al. | 235/61.6 R |
| 3,824,544 A | 7/1974 | Simjian | 340/147 |
| 3,845,470 A | 10/1974 | Schuller | 340/149 |
| 3,852,571 A | 12/1974 | Hall et al. | 235/61.7 B |
| 3,982,103 A | 9/1976 | Goldman | 235/61.7 B |
| 4,109,238 A | 8/1978 | Creekmore | 340/149 |
| 4,187,498 A | 2/1980 | Creekmore | 340/149 |
| RE30,579 E | 4/1981 | Goldman et al. | 340/149 |
| RE30,580 E | 4/1981 | Goldman et al. | 340/149 |

(Continued)

FOREIGN PATENT DOCUMENTS

| | | |
|---|---|---|
| CA | 2211811 | 2/1998 |

*Primary Examiner*—Joseph Mancuso
*Assistant Examiner*—Nancy Bitar
(74) *Attorney, Agent, or Firm*—Bryan Cave, LLP (57) ABSTRACT

A system for facilitating a check-cashing transaction in accordance with the present invention comprises a check-cashing apparatus and a host system in communication with the check-cashing apparatus. The check-cashing apparatus has input devices for receiving check data and identification data from a user. The host system includes one or more processors configured to receive check data, identification data, check image and membership data input by the user at the check-cashing apparatus. The host system can authenticate the identification data by applying a validation algorithm to the identification data or by cross-referencing the data against one or more databases containing validated identification data. If the check cashing apparatus includes a device for capturing biometric information, the identification data can also be authenticated by comparing the biometric information captured at the time of the transaction with stored biometric information relating to the user. The host system can authenticate the check data by: converting one or more of the data fields of the check image into a format capable of being processed. The converted data is then compared to the check data input by the user. The host system can calculate a score for each data field based on a probability that the converted data from the check image matches the check data input by the user. The processor determines automatically whether to approve the check by applying a risk assessment guidelines.

60 Claims, 4 Drawing Sheets

U.S. PATENT DOCUMENTS

| | | | |
|---|---|---|---|
| 4,270,042 A | 5/1981 | Case | 235/379 |
| 4,271,351 A | 6/1981 | Bloodworth | 235/375 |
| 4,321,672 A | 3/1982 | Braun et al. | 364/408 |
| 4,404,649 A | 9/1983 | Nunley et al. | 364/900 |
| 4,523,330 A | 6/1985 | Cain | 382/7 |
| 4,580,040 A | 4/1986 | Granzow et al. | 235/379 |
| 4,617,457 A | 10/1986 | Granzow et al. | 235/379 |
| 4,672,377 A | 6/1987 | Murphy et al. | 340/825.34 |
| 4,673,802 A | 6/1987 | Ohmae et al. | 235/379 |
| 4,678,895 A | 7/1987 | Tateisi et al. | 235/379 |
| 4,678,896 A | 7/1987 | Carlson et al. | 235/380 |
| 4,686,357 A | 8/1987 | Douno et al. | 235/379 |
| 4,727,243 A | 2/1988 | Savar | 235/379 |
| 4,733,060 A | 3/1988 | Dono et al. | 235/379 |
| 4,743,743 A | 5/1988 | Fukatsu | 235/379 |
| 4,745,265 A | 5/1988 | Douno et al. | 235/379 |
| 4,758,714 A | 7/1988 | Carlson et al. | 235/380 |
| 4,810,866 A | 3/1989 | Lord, Jr. | 235/379 |
| 4,823,264 A | 4/1989 | Deming | 364/408 |
| RE32,985 E | 7/1989 | Nagata et al. | 364/401 |
| 4,933,536 A | 6/1990 | Lindemann et al. | 235/375 |
| 4,934,772 A | 6/1990 | Sakuma et al. | 350/6.5 |
| 4,948,174 A | 8/1990 | Thomson et al. | 283/58 |
| 4,974,878 A | 12/1990 | Josephson | 283/67 |
| 5,012,077 A | 4/1991 | Takano | 235/380 |
| 5,023,436 A | 6/1991 | Takada et al. | 235/380 |
| 5,053,607 A | 10/1991 | Carlson et al. | 235/379 |
| 5,085,417 A * | 2/1992 | Copham | 270/1.02 |
| 5,093,787 A | 3/1992 | Simmons | 364/406 |
| 5,121,945 A | 6/1992 | Thomson et al. | 283/58 |
| 5,175,682 A | 12/1992 | Higashiyama et al. | 364/408 |
| 5,195,133 A | 3/1993 | Kapp et al. | 380/9 |
| 5,231,569 A | 7/1993 | Myatt | 364/408 |
| 5,237,159 A | 8/1993 | Stephens et al. | 235/379 |
| 5,305,196 A | 4/1994 | Deaton et al. | 364/401 |
| 5,444,616 A | 8/1995 | Nair et al. | 364/405 |
| 5,448,471 A | 9/1995 | Deaton et al. | 364/401 |
| 5,479,530 A | 12/1995 | Nair et al. | 382/119 |
| 5,484,988 A | 1/1996 | Hills et al. | 235/379 |
| 5,500,513 A | 3/1996 | Langhans et al. | 235/380 |
| 5,504,677 A | 4/1996 | Pollin | 364/408 |
| 5,592,377 A | 1/1997 | Lipkin | 705/42 |
| 5,679,938 A | 10/1997 | Templeton et al. | 235/379 |
| 5,679,940 A | 10/1997 | Templeton et al. | 235/380 |
| 5,703,344 A | 12/1997 | Bezy et al. | 235/379 |
| 5,897,625 A | 4/1999 | Gustin et al. | 705/43 |
| 5,952,639 A | 9/1999 | Ohki et al. | 235/379 |
| 5,987,439 A * | 11/1999 | Gustin et al. | 705/43 |
| 6,012,048 A | 1/2000 | Gustin et al. | |
| 6,038,553 A | 3/2000 | Hyde, Jr. | 705/45 |
| 6,045,039 A | 4/2000 | Stinson et al. | 235/379 |
| 6,059,185 A | 5/2000 | Funk et al. | 235/379 |
| 6,105,009 A | 8/2000 | Cuervo | |
| 6,129,273 A | 10/2000 | Shah | 235/380 |
| 6,145,738 A | 11/2000 | Stinson et al. | 235/379 |
| 6,149,056 A | 11/2000 | Stinson et al. | 235/379 |
| 6,164,528 A | 12/2000 | Hills et al. | 235/379 |
| 6,181,814 B1 * | 1/2001 | Carney | 382/137 |
| 6,283,366 B1 | 9/2001 | Hills et al. | 235/379 |
| 6,286,756 B1 | 9/2001 | Stinson et al. | 235/380 |
| 6,328,207 B1 | 12/2001 | Gregoire et al. | 235/379 |
| 6,354,491 B2 | 3/2002 | Nichols et al. | 235/379 |
| 6,390,365 B1 * | 5/2002 | Karasawa | 235/384 |
| 6,405,182 B1 | 6/2002 | Cuervo | |
| 6,488,203 B1 | 12/2002 | Stoutenburg et al. | 235/379 |
| 6,536,663 B1 | 3/2003 | Lozier et al. | |
| 6,547,132 B1 | 4/2003 | Templeton et al. | 235/380 |
| 6,578,760 B1 | 6/2003 | Otto | 235/379 |
| 6,592,029 B2 | 7/2003 | Brikho | 235/379 |
| 6,615,190 B1 | 9/2003 | Slater | 705/41 |
| 6,648,220 B1 | 11/2003 | Junkins et al. | |
| 6,948,656 B2 * | 9/2005 | Williams | 235/380 |
| 7,070,092 B2 * | 7/2006 | Phillips et al. | 235/379 |
| 7,152,784 B2 * | 12/2006 | Douglass et al. | 235/379 |
| 2002/0004781 A1 | 1/2002 | Forsyth | 705/39 |
| 2002/0082962 A1 | 6/2002 | Farris et al. | 705/35 |
| 2002/0138424 A1 | 9/2002 | Coyle | 705/39 |
| 2002/0138428 A1 * | 9/2002 | Spear | 705/41 |
| 2002/0152168 A1 | 10/2002 | Neofytides et al. | 705/44 |
| 2002/0152170 A1 | 10/2002 | Dutta et al. | 705/45 |
| 2002/0153414 A1 | 10/2002 | Stoutenburg et al. | 235/380 |
| 2002/0156683 A1 | 10/2002 | Stoutenburg et al. | 705/16 |
| 2002/0161702 A1 | 10/2002 | Milberger et al. | 705/39 |
| 2002/0166891 A1 | 11/2002 | Stoutenburg et al. | 235/379 |
| 2003/0015583 A1 | 1/2003 | Abdi et al. | 235/379 |
| 2003/0023555 A1 | 1/2003 | Rees | 705/44 |
| 2003/0065624 A1 | 4/2003 | James et al. | 705/64 |
| 2003/0069841 A1 | 4/2003 | Thompson | 705/39 |
| 2003/0069856 A1 | 4/2003 | Seifert et al. | 705/73 |
| 2003/0080185 A1 | 5/2003 | Werther | 235/380 |
| 2003/0083987 A1 | 5/2003 | Stoutenburg et al. | 705/39 |
| 2003/0089768 A1 | 5/2003 | Page | 235/379 |
| 2003/0093368 A1 * | 5/2003 | Manfre et al. | 705/39 |
| 2003/0097270 A1 * | 5/2003 | Musselwhite et al. | 705/1 |
| 2003/0111529 A1 | 6/2003 | Templeton et al. | 235/380 |
| 2003/0130919 A1 * | 7/2003 | Templeton et al. | 705/35 |
| 2003/0130940 A1 | 7/2003 | Hansen et al. | 705/39 |
| 2003/0130948 A1 | 7/2003 | Algiene et al. | 705/44 |
| 2003/0182214 A1 * | 9/2003 | Taylor | 705/35 |
| 2003/0200180 A1 | 10/2003 | Phelan, III et al. | 705/65 |
| 2005/0125295 A1 * | 6/2005 | Tidwell et al. | 705/16 |

* cited by examiner

CHECK CASHING SYSTEMS AND METHODS

CROSS-REFERENCE TO PROVISIONAL APPLICATION

This application claims the benefit of priority of U.S. Provisional Application No. 60/378,469, filed May 7, 2002.

FIELD OF THE INVENTION

The invention generally relates to the field of authenticating a transaction and assessing associated risks, and more particularly to systems and methods for authenticating a check-cashing transaction and assessing risks associated with a check-cashing transaction.

BACKGROUND

Many individuals and institutions use checks as a medium for monetary payment or for transferring monies to another party. Typically, an individual or institution opens a checking account with a financial institution. The financial institution provides the ability to write checks against monetary finds held in the checking account. When an individual or institution writes a check for a specified amount to another party, the party must then "cash" the check with the financial institution to obtain the specified amount on the check held by the financial institution in the individual or institution's checking account.

There may be some risks involved with check-cashing transactions. In some instances, a check-cashing transaction can involve fraud. For example, a person can fraudulently misrepresent their own identity as one authorized to cash a particular check. If the check is written by an unauthorized person for a specified amount and cashed by the financial institution, the monetary funds held in the checking account may be wrongfully taken by the unauthorized person. Thus, a need exists for systems and methods for authenticating a person's identity in a check-cashing transaction.

In another instance, a person can fraudulently create a check and attempt to cash the fraudulent check. Again, monetary funds held in a checking account may be wrongfully taken by the person using the fraudulent check. Thus, a need exists for systems and methods for authenticating a check in a check-cashing transaction.

Finally, a financial institution or another third party involved in check-cashing transactions is exposed to financial or legal risk during these types of transactions. These risks may impose additional financial or legal burdens on the institution or third party. Thus, a need exists for systems and methods for assessing associated risks involved in a check-cashing transaction.

As described above, there are numerous risks involved in each step of a check-cashing transaction. These risks may impose additional financial or legal burdens on the institution or third party involved in the check-cashing transaction. Therefore, a need exists for systems and methods for authenticating a check-cashing transaction and assessing associated risks.

SUMMARY OF THE INVENTION

The invention satisfies the needs described above and provides other advantageous results. The systems and methods described herein facilitate a check cashing transaction by authenticating the user's identity, authenticating information relating to the check, and assessing risks associated with the transaction.

A system for facilitating a check-cashing transaction in accordance with the present invention comprises a check-cashing apparatus and a host system in communication with the check-cashing apparatus.

The check-cashing apparatus can have one or more input devices (e.g., keyboard, card reader, and check reader) for receiving check data and identification data (e.g., a driver's license number) from a user. In one embodiment, the check cashing apparatus included a check scanner for capturing an image of a check presented by the user. The image includes one or more data fields (e.g., legal amount, courtesy amount, payee, signature, endorsement, date and check type). The check-cashing apparatus can also have a card reader, which can be used to capture data from a membership card, identification card, and/or driver's license. The check-cashing apparatus can also include a device for capturing biometric information of the user (e.g., fingerprint, retinal scan, photo or a DNA analysis, etc.).

The host system can be remotely located from the check cashing apparatus. The host system includes one or more processors configured to receive check data, identification data, check image and membership data input by the user at the check-cashing apparatus.

The host system can authenticate the identification data by applying a validation algorithm to the identification data. For example, the algorithm may be based on coding of name or date of birth information into the user's driver's license number. Identification data can also be authenticated by cross-referencing the data against one or more databases containing validated identification data. If the check cashing apparatus includes a device for capturing biometric information, the identification data can also be authenticated by comparing the biometric information captured at the time of the transaction with stored biometric information relating to the user.

The host system can authenticate the check data by converting one or more of the data fields of the check image into a format capable of being processed. The converted data is then compared to the check data input by the user. The host system can calculate a score for each data field based on a probability that the converted data from the check image matches the check data input by the user. An image filter comprising criteria for determining if the check data is valid can then be applied to the transaction based upon one or more of the data field scores. If the transaction fails the image filter, the host processor can transfer the transaction for manual review.

If the transaction passes the image filter, the processor can determine automatically whether to approve the check by applying a plurality of risk assessment guidelines. In one embodiment, the application of each guidelines produces a factor score. The host processor calculates a cumulative score which is a function of the amalgamation of the factor scores and determines whether to approve check based upon the cumulative score. Upon approval of the check, the host processor provides a signal to the check-cashing apparatus to dispense cash.

The host processor and check cashing apparatus can also be configured in accordance with the present invention to perform a membership enrollment process for new users. After receiving identification data, the processor determines if the user is an existing member by cross-referencing the identification data against the membership databases. If the user is not an existing member, a membership application process is initiated. The check cashing apparatus is prompted to query the user for membership data, which includes demographic data relating to the user. The demographic data is authenticated by cross-referencing the demographic data against one or more databases containing validated demographic information. Upon authentication of the demographic data, a membership for the user is established and the membership data is stored in the membership database. If the user is an existing member or has established membership, the processor determines automatically whether to approve the check by applying one or more risk assessment guidelines using the identification data and check data.

DESCRIPTION OF DISCLOSED EMBODIMENTS

The invention provides systems and methods for authenticating a person's identity, authenticating a check, and assessing associated risks involved in a check-cashing transaction.

The invention can be embodied in a system including a check cashing apparatus such as a kiosk that can be located in remote locations for user convenience. The kiosk will be in communication with a host, server, or check-cashing entity that administers one or more features offered by the kiosk. By way of example, the kiosk can include a processor-based platform such as a personal computer executing methods embodied in software programs and/or routines. The kiosk can include, but is not limited to, a display device, an input device, a communication link, a card reader, a biometric device, a phone or another communication device, a check reader or scanner, and an imaging camera. The processor-based platform can execute imaging character recognition software or routines or otherwise be able to access character recognition software or routines executed in a remote location. Furthermore, the processor-based platform, should be in communication with the host, server, or check-cashing entity via the communication link operable to communicate via the Internet, wireless communication, telecommunications, or another mode of communication. The host, server, check-cashing administrative entity, or another administrative entity can include or otherwise access a processor-based platform executing associated methods embodied in software programs and/or routines. Typically, the host, server, check-cashing administrative entity, or another administrative entity communicates with the processor-based platform at the kiosk via the communication link. The host, server, check-cashing administrative entity, or another administrative entity can include or otherwise communicate with an associated call center that is in communication with the kiosk via a phone or another communication device associated with the kiosk.

Furthermore, the host, server, check-cashing administrative entity, or another administrative entity can include or otherwise communicate with an internal and/or external database containing consumer demographic data, consumer identification information, etc. Note that the invention may also be embodied in other systems associated with processor-based platforms configured for executing a set of computer-executable instructions embodying the method and routines described below in FIGS. 1-4.

Figure 1:
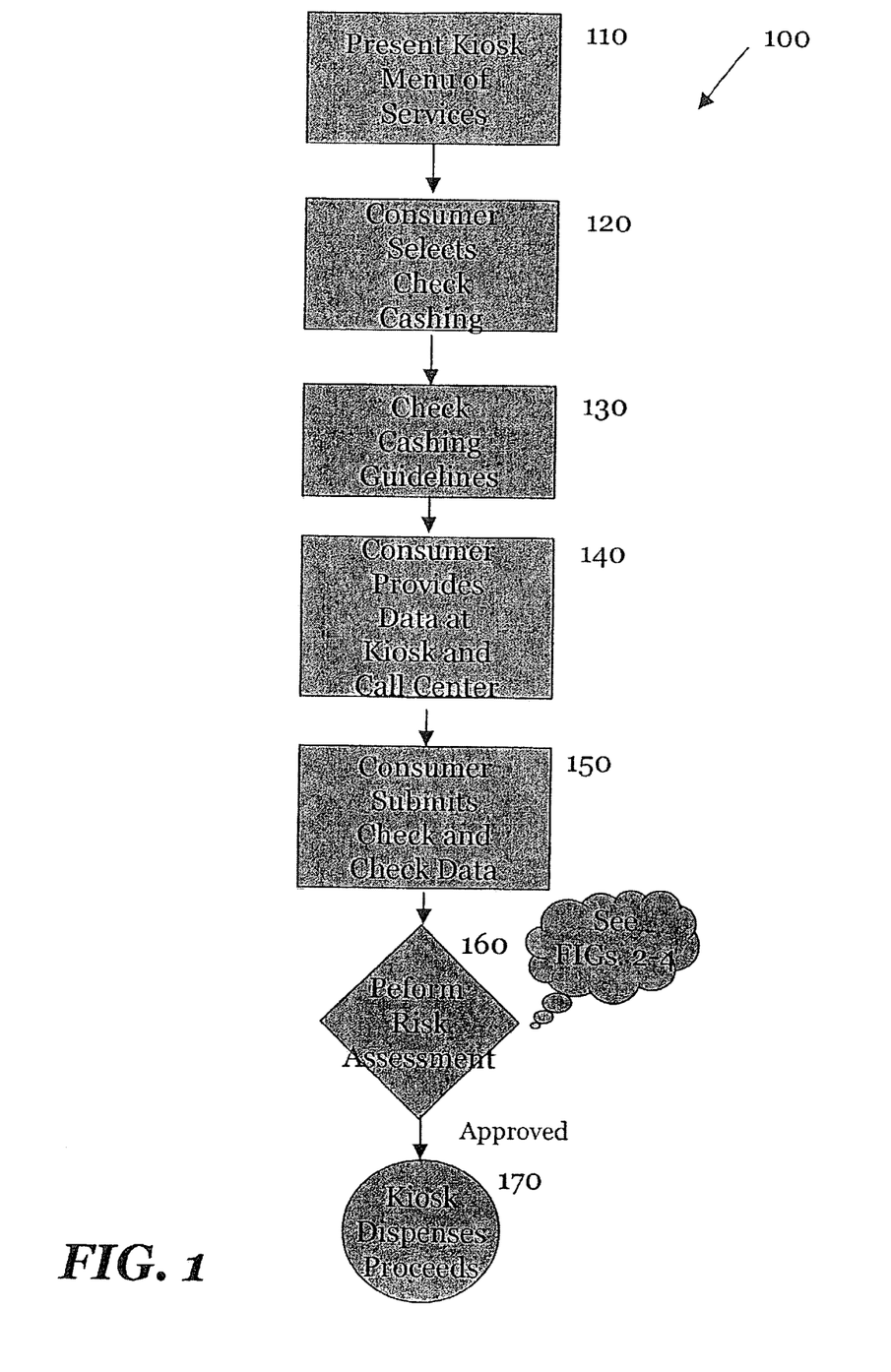
FIG. 1 is a flowchart of an exemplary embodiment of a method in accordance with the invention.

FIG. 1 is a flowchart of an exemplary embodiment of a method in accordance with the invention. The method 100 begins at 110.

In 110, a kiosk menu of services is presented to a consumer or user. The kiosk menu can include, but is not limited to options such as: Check Cashing, ATM functions, Money Order purchase, Money Transfers (Send/Receive), Stored Value cards (Phone Cards, Retailers, etc.), Obtaining Credit Bureau Files; and Internet shopping. By way of an associated input device, consumers are prompted to select one or more options from the kiosk menu. The kiosk menu can be presented to the consumer or user in one or more languages. A consumer or user may be given the option to select a particular language such as English, Spanish, or any other language that has financial relevance in a particular check-cashing market. Based on the language selected, all subsequent kiosk menu options and screens will be presented in that language. Initially, the menu of services will appear on an associated kiosk screen or display device.

110 is followed by 120, in which a consumer selects a check-cashing feature from the kiosk menu. Typically, the kiosk includes an associated input device can be utilized so that the consumer or user can select one or more options presented. For example, using an input device such as a touch screen display, a user can select an option labeled as "Check Cashing."

120 is followed by 130, in which check-cashing Guidelines are presented to the consumer or user. Upon making the selection of "Check Cashing" on the kiosk, check-cashing Guidelines are presented to the consumer or user for review. These guidelines can include, but are not limited to, acceptable check types, maximum check amounts by check type, minimum check amounts, acceptable check date ranges by check type and approximate fee ranges by check type.

130 is followed by 140, in which a consumer or user provides data at the kiosk and/or call center. For example, new consumers enter their social security number at the kiosk. The consumer will have the option of using a membership card to initiate the check transaction. The card can be, but is not limited to, a smart card, a card with a magnetic strip, or a card with an embedded microchip. If the consumer is an existing check-cashing member, then the consumer can dip a membership card in the card reader and enter a pre-registered PIN number previously selected by the user to proceed with check cashing. As long as the membership is shown as "Active" on the host, server, or system administered by the check-cashing administrative entity or another administrative entity, and the PIN number validates, the consumer can proceed with check cashing.

In some instances, the consumer can also use the check-cashing function without a membership card. Through the use of a social security number (SSN) the consumer can cash checks. The consumer can be prompted to enter his or her SSN on one kiosk screen, then enter it on the next screen as well to verify that no keystroke errors were made. The SSN must be consistent with both attempts on the screens in order to proceed. The host, server, or system administered by the check-cashing entity can then validate the SSN as an active membership. If the consumer uses the correct PIN associated with that SSN, then the consumer can proceed to check cashing.

However, if a consumer without an active membership card, enters a SSN at the kiosk and the host does not find an active or suspended membership, then the consumer will initially be taken through the membership sign up process.

There is certain demographic information that should be obtained from the consumer to complete their membership application. The following describes an example of information that may be needed and how that information can be obtained.

For example, once the host system determines that the SSN does not reside in an active or suspended membership status, the consumer is prompted to select a PIN number. The PIN number is prompted a second time to ensure both attempts are consistent. Both attempts must match to continue. The consumer can be queried regarding their possession of a state-issued driver's license or an identification card. All negative responses move on to the next screen.

Positive responses are greeted with an orientation screen such as a flash movie demonstrating how to dip their driver's license or identification card into an associated card reader. After reviewing the orientation screen, the consumer can then be prompted to dip his or her driver's license or identification card in the card reader, where the card reader obtains consumer demographic data from the driver's license or identification card. Consumer demographic data can include, but is not limited to name, address (lines 1, 2 and 3), issuing state, identification number, date of birth, issue date, expiration date, evidence of identification's security features and an electronic image of the photo.

In some instances, the kiosk may include a biometric device. The kiosk may prompt the consumer to provide any or all of the following via the biometric device: fingerprint, retinal scan, facial biometric photo or a DNA analysis.

Once the consumer has submitted data either by dipping a driver's license or State issued identification card in the kiosk card reader or by submitting biometric data to a biometric device, a string of data is created. Once the string of data has been completed at the kiosk it is transmitted to a host, server, check-cashing administrative entity, or another administrative entity for further processing or decision making.

The host, server, check-cashing administrative entity, or another administrative entity receives the string of data from the kiosk, and attempts to independently, through on-line access, verify the data collected.

Typically, the string of data will be used to complete an application. If necessary or required application data is either incomplete or lacks a sufficient level of confidence, the consumer will be prompted to use an associated kiosk phone to contact a call center to complete the application.

All membership data captured from the kiosk will be delivered to the host, server, check-cashing administrative entity, or another administrative entity for all consumers who are referred to the call center. This data will be placed in the host, server, check-cashing administrative entity, or another administrative entity's queue. Consumers referred to the call center will be greeted and queried for the last four digits of their SSN. A match of those four digits will retrieve the application. That application will contain all of the successfully captured data form the kiosk and authentication procedures. The call center or an associated agent will validate the information already captured with the consumer and obtain the missing data on the call. Once the application is complete it will be submitted for processing. If there are any editable errors in the application, the call center or associated agent will be prompted to verify that data. The application is submitted again and the final response appears for the call center or associated agent. The consumer is then referred to the kiosk screen for the application decision and the call is ended.

All completed applications that pass the above consumer authentication procedures will then proceed to the following procedures of the check-cashing process. 140 is followed by 150, in which the consumer or user submits check and check data. The consumer will select from a list of check types available for check-cashing at that kiosk. Typically, the kiosk collects additional information from the consumer to complete the check-cashing process.

For example, the consumer is prompted by a kiosk screen to enter the check date and check amount. Using the associated input device such as a keyboard, the consumer enters the check date and check amount. The consumer can then be prompted to insert the check into an associated check reader or scanner at the kiosk. Imaging character recognition software executing at the kiosk may attempt to read and validate the check date and/or check amount entered. If the check date and/or check amount is recognized and verified by the software, a screen is presented to the consumer that displays an image of the inserted check and prompts the consumer to verify the check date and/or check amount entered against the displayed image of the check. If the character recognition software provides a negative response, then the system displays a screen prompting the consumer to re-enter the check data. In this manner, entry of relevant check or other financial data can be expedited with the use of imaging character recognition software. For example, a magnetic ink character recognition (MICR) number can be read and determined.

150 is followed by 160, in which one or more risk assessments are performed. Typically, the host, server, check-cashing administrative entity, or another administrative entity executes a Membership Application Process (MAP) or routine to authenticate the consumer's identity. Furthermore, the host, server, check-cashing administrative entity, or another administrative entity can execute a check-cashing risk assessment process or routine to authenticate the check being presented by a consumer, and to assess or evaluate the risk involved in a particular check-cashing transaction involving the consumer and the check presented. Each of these three routines is further discussed and described below with respect to FIGS. 2-4. Note that other processes and routines involving risk assessments may be performed by the host, server, check-cashing administrative entity, or another administrative entity in accordance with the invention. Furthermore, the consumer authentication and check authentication routines can be done in any particular order prior to assessing or evaluating the risk involved in a particular check-cashing transaction involving the consumer and the check presented for cashing.

Depending upon the results of the risk assessments performed, the method 100 proceeds to 170. For example, if the results of the risk assessments result in approval of the consumer, check, and transaction, then the "Approved" branch leads to 170. If however, any of the risk assessment routines reject the particular consumer, check, or transaction, the method 100 will not complete the transaction and will not proceed to 170. In this event, the kiosk will not dispense proceeds to the consumer.

In 170, the kiosk dispenses proceeds to the consumer. For example, if the consumer's identity is authenticated by the Membership Application Process (MAP) or routine, the consumer's check is authenticated by the check-cashing risk assessment process or routine, and the check-cashing risk assessment process or routine approves the transaction based upon the assessment or evaluation of the transaction, then the consumer may complete the transaction and receive a disbursement of proceeds from the kiosk.

Figure 2:
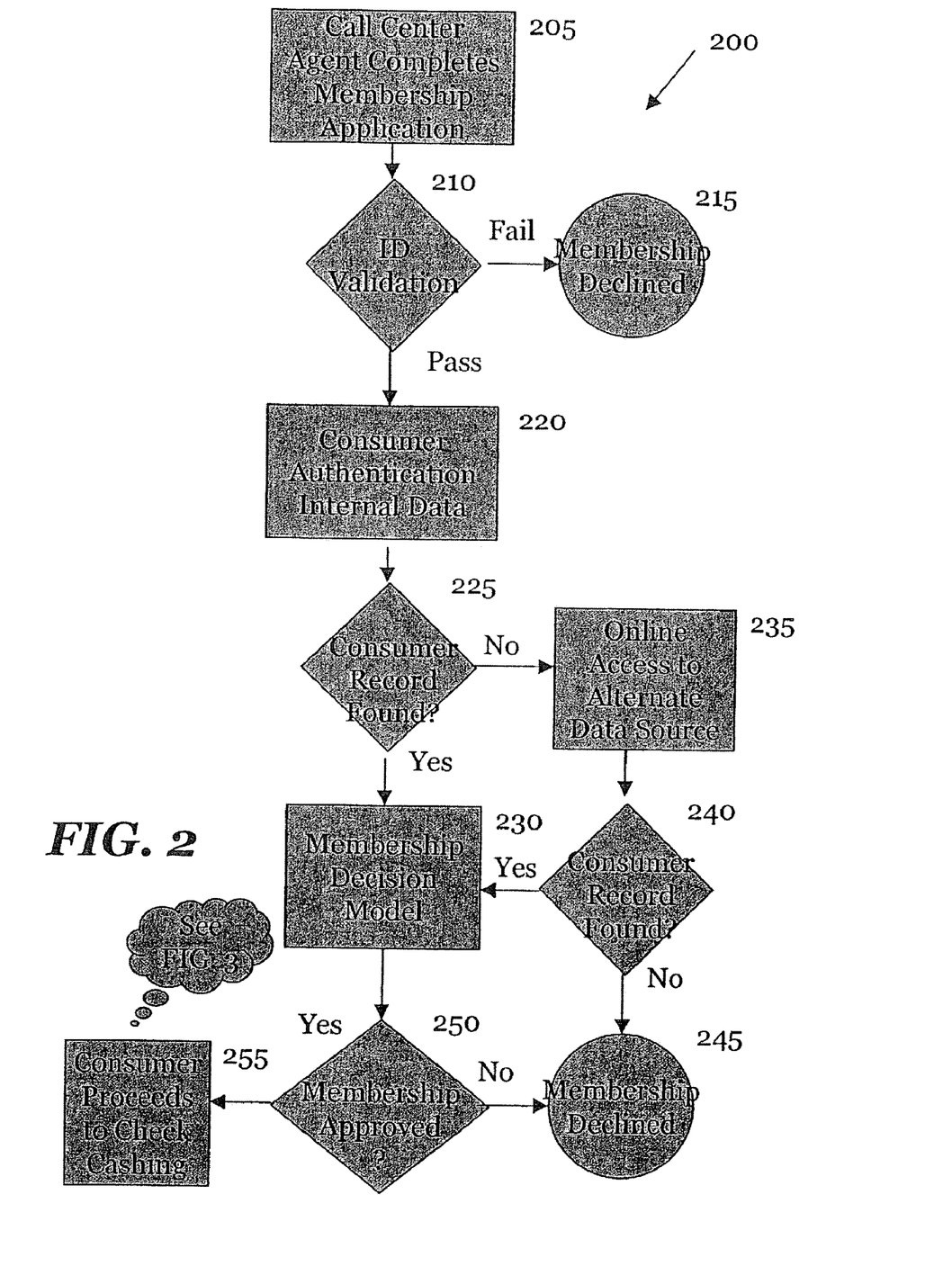
FIG. 2 is a flowchart of an exemplary embodiment of a risk assessment routine associated with a method in accordance with the invention.

FIG. 2 is a flowchart of an exemplary embodiment of a risk assessment routine associated with a method in accordance with the invention. The embodiment of a risk assessment routine shown in FIG. 2 illustrates authentication of a consumer's identity and assessment of the risk associated with authentication of a consumer's identity. The routine 200 begins at 205.

At 205, a completed membership application is submitted. Typically, a completed membership application can be submitted by a consumer communicating with a kiosk or can be submitted via phone during a call to an associated call center. Data for authenticating the consumer's identity in a Membership Application Process can either be manually obtained during a call from the user at the kiosk to an associated call center, or can be automatically populated, using consumer demographic data or identification information already or previously obtained from the consumer or from other data sources. Data for authenticating a consumer's identity includes, but is not limited to, the consumer's name, address, phone number, social security number, State or governmental issued identification number, date of birth, employer, employer's phone number and a password (typically a mother's maiden name).

205 is followed by 210, in which ID validation is attempted. Generally, the host, server, check-cashing administrative entity, or another administrative entity attempts to validate part or all of the data for authenticating a consumer's identity. For example, a check-cashing administrative entity may validate that the identification number presented by the consumer is associated with a validly issued state or governmental identification card from the state or governmental entity that issued the card and/or number. The check-cashing administrative entity may verify that the identification number belongs to the consumer that is presenting it at the kiosk, through the use of one or more date of birth or name algorithms as well as through driver's license files or databases. Many states or governments use predetermined algorithms when issuing driver's license numbers. These algorithms are often based on coding of name and/or date of birth information into the issued driver's license number. These algorithms, by state and/or government, are then stored, embedded, or otherwise accessed by the host, server, check-cashing administrative entity, or another administrative entity.

As another example, a check-cashing administrative entity may also validate the consumer's social security number to ensure it is a validly issued number. The Social Security Administration (SSA) produces a file that identifies all validly issued series of social security numbers. Series of social security numbers can be readily identified by state of issuance and by date of issuance. The data that the SSA provides are then stored, embedded, or otherwise accessed by the host, server, check-cashing administrative entity, or another administrative entity.

If the identification validation of 210 is not successful, then the "Fail" branch is followed to 215. In 215, the membership is declined, and the consumer is notified that the attempted transaction has been cancelled. If the identification validation of 210 is successful, then the "Pass" branch is followed to 220.

In 220, consumer authentication internal data is queried. A query of internal data is made by the host, server, check-cashing administrative entity, or another administrative entity to authenticate a consumer's identity. Information from the consumer's membership application can be used to query an existing internal consumer database containing consumer information. For example, information to be used in a database query can be, but is not limited to, social security number, driver's license number (state or government issued identification number), name, address, phone number, date of birth and checking account number. In this manner, the host, server, check-cashing administrative entity, or another administrative entity seeks to locate a match of the consumer's identification information on an existing database in order to authenticate the consumer's identity. Other consumer demographic data that the consumer supplied can also be verified in this manner.

By way of further example, an internal consumer database containing a primary index, such as social security number or driver's license number can be accessed by a check cashing administrative entity. Specific data such as social security number, driver's license number (state or government issued identification number), name, address, phone number, date of birth and checking account number are queried in the internal consumer database.

220 is followed by decision block 225, in which a decision is made whether a consumer record is found. If a consumer record is found, then the "YES" branch is followed to 230. In 230, a membership decision model is applied to determine a score. When a matching consumer record is found, the method determines a score for the match dependent upon the correlation of the matching consumer record with the data collected from and submitted by the consumer. The membership decision model can then make a decision with respect to approving a particular consumer's membership application. Consumer data that is used to make the membership application decision includes, but is not limited to, the social security number, the name, the driver's license number, the date of birth, the address, the phone number, the employer name and phone number and the checking account number.

Returning to decision block 225, if no match is found in the internal consumer database for the consumer, then the "No" branch is followed to 235. In 235, online access to an alternate data source is established. In this manner, a check-cashing administrative entity accesses at least one external data source to attempt to authenticate the consumer's identity. An external data source includes a third party provider of consumer data that can be accessed electronically to match one or more primary indexes (SSN and driver's license), and can be further utilized to verify other consumer demographic data, as previously mentioned.

235 is followed by decision block 240, in which a decision is made whether a consumer record is found. That is, whether a matching consumer record is found in an alternate data source. If a matching consumer record is found in an alternate data source, then the "YES" branch is followed back to 230 which has been previously discussed above.

If however, no matching consumer record is found, then the "NO" branch is followed to 245. In 245, membership is declined. That is, the consumer is notified that his or her membership application was declined, and the consumer cannot proceed with the transaction. Membership decline messages are sent to the kiosk and any Fair Credit Reporting Act (FCRA) Adverse Action Amendment information is displayed for the consumer, with a toll free number to obtain more specific reasons for the declined membership application.

However, in some circumstances, a particular consumer may have a check writing history associated with the consumer's identification The decision to decline a consumer's membership application can be overridden if a "positive" check writing history is associated with the consumer's identification. Alternatively, a "positive" pay history on the full magnetic ink character recognition (MICR) number the consumer is presenting may be relied upon to override a decision to decline a consumer's membership application.

The host, server, check-cashing administrative entity, or another administrative entity can maintain a minimum "positive" file criteria set for a cumulative number and dollar amount of checks written and/or cashed with the host, server, check-cashing administrative entity, or another administrative entity. Once this minimum is reached the consumer's identification is placed on the internal "positive" file. That internal "positive" file can be stored or otherwise accessed by the host, server, check-cashing administrative entity, or another administrative entity.

Furthermore, an internal "positive pay" file can be created from one or more payroll checks that have been presented for check-cashing without resulting in an associated returned item. The actual checking account number of the payroll check can be stored in the internal "positive pay" file versus the consumer's identification.

In other instances, a consumer may initiate a call to the call center to correct membership application information or an inquiry can be made to a consumer regarding invalid entries in a membership application when the information obtained from internal or external data sources conflicts with data obtained from the consumer to ensure the application does not contain dated or incorrect information. In these instances, the call center can edit one or more incorrect or invalid entries in a membership application. For example, a consumer's last name can be edited by the call center if there is a mismatch with a consumer data source, or a driver's license number and date of birth can be edited if one of the driver's license algorithms failed for the consumer data presented. When the call center has completed a membership application using edited information, the membership decision model in 230 can be applied to the application.

Returning to 230, where the membership decision model determines a score for a membership application utilizing any matching consumer records, a membership decision model attempts to create an objective score for use in making a decision about a particular membership application.

230 is followed by decision block 250, in which a decision is made whether to approve a membership application. When a membership application is scored, a decision is made to approve or decline the consumer's membership application. If the membership is not approved, then the "NO" branch is followed to 245, in which the application is declined and the consumer notified, as described above. If the membership is approved, then the "YES" branch is followed to 255 in which the consumer proceeds to the check-cashing process described in FIG. 3. In 255, the consumer can be notified of membership approval and the check authentication routine of FIG. 3 begins.

Figure 3:
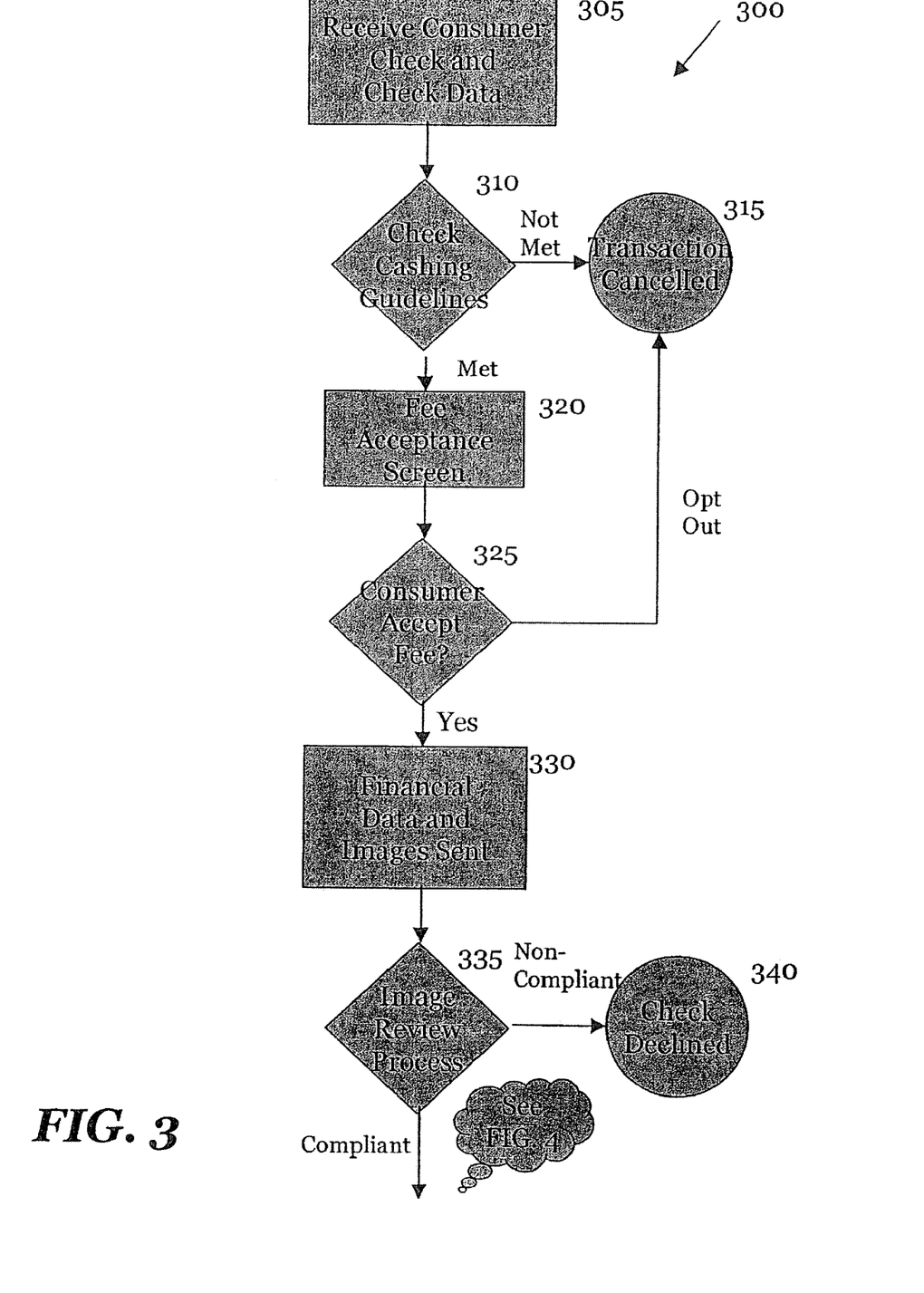
FIG. 3 is another flowchart of an exemplary embodiment of a risk assessment routine associated with a method in accordance with the invention.

FIG. 3 is another flowchart of an exemplary embodiment of a risk assessment routine associated with a method in accordance with the invention. The embodiment of a risk assessment routine shown in FIG. 3 illustrates authentication of a consumer's check and assessment of the risk associated with authentication of a consumer's check The method 300 begins at 305.

In 305, the invention receives a consumer's check and check data. Typically, a consumer is prompted in 150 to present the check for cashing. The kiosk prompts the consumer to position the check in the check reader or scanner so that the image of the check can be captured. The kiosk sends or otherwise transmits the consumer's check and/or check data to a host, server, check-cashing administrative entity, or another administrative entity for processing.

305 is followed by decision block 310, in which a decision is made whether the consumer meets the check-cashing guidelines presented to the consumer via the kiosk display in 130 in FIG. 1. If the consumer does not meet the check-cashing guidelines, then the "NOT MET" branch is followed to 315. In 315, the transaction is cancelled, and the consumer is notified that the check-cashing guidelines were not met. The consumer will not be able to proceed with the transaction, and the routine 300 ends. However, returning to the decision block 310, if the consumer does meet the check-cashing guidelines, then the "MET" branch is followed to 320.

In 320, a fee acceptance screen is displayed to the consumer. Generally, the consumer is prompted to accept a transaction fee. After the host, server, check cashing administrative entity, or another administrative entity receives sufficient check data, a relevant string of data is sent to the host, server, check-cashing administrative entity, or another administrative entity to calculate a transaction fee. The relevant string of data used to calculate the transaction fee can be, but is not limited to the check amount, the check type, the kiosk number, and a promotion code. Upon calculation of a transaction fee, a fee acceptance screen is then shown to the consumer at the kiosk, and the consumer is shown a proposed transaction fee and prompted to accept the fee or cancel the transaction.

320 is followed by decision block 325, in which a decision is made whether the consumer accepted the transaction fee. If the consumer did not accept the transaction fee, then the "OPT OUT" branch is followed to 315, and the transaction is cancelled. However, returning the decision block 325, if the consumer accepts the transaction fee, then the "YES" branch is followed to 330.

In 330, the financial data and check images are sent or transmitted to the host, server, check-cashing administrative entity, or another administrative entity. Check images, front and back, are transmitted to the host, server, check-cashing administrative entity, or another administrative entity. Note that these check images are binary, as well as bi-tonal for use with image character recognition software, as well as for manual review. The imaging software, administered by the host, server, check-cashing administrative entity, or another administrative entity, reviews the key fields on each submitted check, including, but not limited to, legal amount, courtesy amount, payee, signature line, endorsement, date and check type.

Furthermore, when the consumer decides to accept the fee, an associated imaging camera at the kiosk takes a photo or otherwise captures an image of the face of the consumer. This biometric data can be stored and used later in the process for further authenticating the consumer's identity, or can be used at a later time to authenticate the consumer's identity.

330 is followed by decision block 335, in which the image review process or routine determines whether the check is authenticated. The image character recognition software can either provide probabilities that the data it reads matches that which the consumer entered, or it can provide probabilities for different data results from a "blind" read. Predetermined or otherwise adjustable probability thresholds are established. Scores that are exceed a predetermined or adjusted probability threshold will then be transmitted through an image filter. For example, a consumer enters via the kiosk input device that her check amount is $500.00. The imaging character recognition software returns a probability score of 93% that the amount on the check itself is $500.00.

The image filter will have criteria such as, but not limited to; dollar amount, check type, kiosk number, day of week, time of day and CAV (Courtesy Amount Verification) score from the kiosk. The CAV score is an imaging recognition software review of the courtesy amount field on a check. A CAV score provides a Yes/No, or range of scores to address the probability that the consumer accurately represented the amount of the check. These image filters determine whether the transaction still needs manual image review. The manual image review includes, but is not limited to; check completeness, proper check type, membership/check cashing photo match, payee/member match, check date/check cashing guidelines criteria, photo integrity, photo quality, fraud indicator and endorsement.

If the image review process or routine determines that a check is not authenticated, then the "NON-COMPLIANT" branch is followed to 340. Typically, scores that are below a predetermined or adjusted probability threshold are transmitted directly for manual image review by an associated call center. Checks that are non-compliant during the manual image review process are declined. In 340, the check is declined. The consumer is notified, and the transaction ends. However, returning to the decision block 335, if the image review process or routine authenticates a check, then the "COMPLIANT" branch is followed to FIG. 4. Typically, all transactions that are not declined in 335 are transmitted to an authorization routine for further processing.

In one instance, any biometric data that was captured during the check transaction would be compared to the biometric data captured during the membership application process in FIGS. 1 and 2. Biometric data can include, but is not limited to, an electronic representation of a fingerprint, retinal scan, facial biometrics, or DNA. That electronic biometric data can either be stored on the membership card, or it can be a database stored at or otherwise accessible by a host, server, check-cashing administrative entity, or another administrative entity. Biometric data, such as a fingerprint, will be converted to an electronic format. For example, a fingerprint will be electronically stored as "track" information on the consumer's membership card. That same electronically stored fingerprint can also be transmitted to host, server, check-cashing administrative entity, or another administrative entity to be stored in an associated database. Each subsequent transaction would send another electronically stored fingerprint for comparison. A biometric comparison that passes, results in the routine continuing to FIG. 4. However, a biometric comparison that has failed will result in a decline, and the routine 300 ends at 340.

Figure 4:
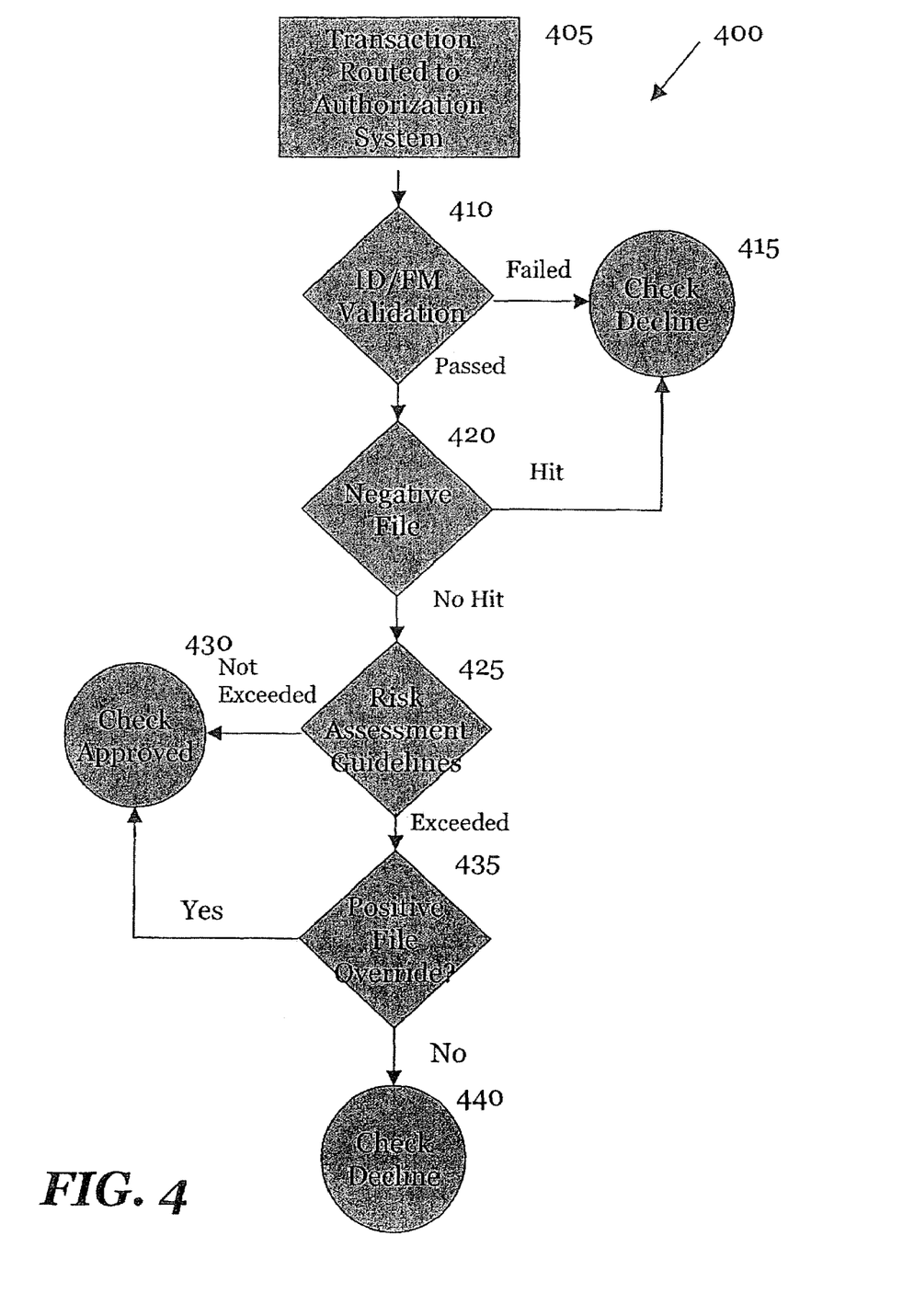
FIG. 4 is another exemplary embodiment of a risk assessment routine associated with a method of the invention.

FIG. 4 is another exemplary embodiment of a risk assessment routine associated with a method of the invention. The embodiment of a risk assessment routine shown in FIG. 4 illustrates assessment and evaluation of the risk associated with a particular check-cashing transaction. The method 400 begins at 405.

405 is followed by decision block 410, in which a decision is made whether the transaction passes an identification and full MICR number (ID/FM) validation. That is, the routine attempts to validate one or more of the identifications associated with a particular check transaction to further verify and authenticate the transaction. In an initial part of the ID/FM validation, the ID validation portion, a routine similar to the membership application processing in 210-240 is followed. For example, the routine attempts to validate the consumer's driver's license and social security numbers against predetermined algorithms for state or government tables stored or otherwise accessible by the host, server, check-cashing administrative entity, or another administrative entity. The ID validation portion can also include validating the consumer's driver's license against an internal or external data source containing driver's license files and respective algorithms for each state or government.

In the FM validation portion, a validation is performed based on the consumer's checking account number. The host, server, check-cashing administrative entity, or another administrative entity compares that number to a database of validly issued paychecks, provided by a payroll preparation organization. For example, a check-cashing administrative entity can utilize on-line access to a financial institution supported file to verify if a consumer's checking account exists, or if it is invalid. The FM validation portion can also verify that the bank routing number (ABA) is a valid number when compared to an internal or external data source containing ABA numbers.

If the ID/FM validation fails for a particular transaction, then the "FAILED" branch is followed to 415, in which the check is declined. If the ID/FM validation passes for a particular transaction, then the "PASSED" branch is followed to 420.

In 420, the transaction is evaluated against a negative file. That is, the check transaction is compared to a "Negative File" maintained by the host, server, check-cashing administrative entity, or another administrative entity. For example, any checks that a check-cashing administrative entity approves for check-cashing are stored in a file. If a check is returned unpaid, the check-cashing administrative entity creates a "negative File" record in a database. That record can be indexed with the consumer's driver's license and associated checking account number. Subsequent check transactions with that same driver's license and/or associated checking account number are subject to decline. The "Negative File" can also contain records of check cashing administrative entity warranted, returned checks that remain unpaid. These returned checks can also be indexed with the identification used for the transaction and the full MICR number. Furthermore, the check-cashing administrative entity can also receive or otherwise access external "Negative File" information that is used in a similar manner. By way of an example, there is a financial institution supported file of checking accounts that have been closed for cause or have a zero balance. These accounts would be considered "Negative File" information.

If a decision is made that a negative file record exists for a particular consumer, then the "HIT" branch is followed to 415, in which the consumer check is declined, as described above. However, returning to decision block 420, if a negative file record is not located for a particular consumer, then the "NO HIT" branch is followed to decision block 425.

In decision block 425, a determination is made whether a particular transaction meets risk assessment guidelines applied to the transaction. Risk assessment guidelines include, but are not limited to, a check-cashing administrative entity artificial intelligence (AI) model. For example, an AI model can use historical data on check-cashing performance to make decisions based on the probability of return.

Other AI models utilize rules that set specific parameters for check amounts and cumulative number of checks within specific periods of time. The artificial intelligence (AI) model utilizes historical data that can be consistently loaded into the model to identify recent, past, and continuing trends. The historical data can include items, but not limited to, check amount, time of day, day of week, store location, check number, check writing history and the classification of merchandise being purchased. The AI model scores all of the data that is obtained in the membership and check transaction. The scores are established by analyzing historical data on all of the components of the transaction.

Furthermore, an associated fraud model may operate in conjunction with the AI model for all or a portion of these transactions. A fraud model is either established through our artificial intelligence, or from a risk assessment team identifying fraud trends and flagging transactions that fall within those trends. For example, a suitable fraud model could consist of one item such as dollar amount, or more likely as a combination of factors that have created a higher probability for a check to be returned unpaid. Typically, a fraud model is reserved for circumstances related to fraud rings that are active in a specific market.

If a particular transaction does not exceed the risk management guidelines, then the "NOT EXCEEDED" branch is followed to 430, in which the consumer's check is approved. In 430, the consumer's transaction is approved, and the consumer is notified. At this point, the consumer can obtain a disbursement of funds as described in 170 in FIG. 1. Typically, all transactions that have reached this point and did not get flagged within the risk assessment parameters will be approved. The server, host, check-cashing administrative entity, or another administrative entity sends a message to the kiosk to display the "We Owe You" screen. The consumer can then choose how she wants the proceeds of the transaction to be disbursed.

If however, a particular transaction exceeds the risk management guidelines, then the "EXCEEDED" branch is followed to decision block 435. In decision block 435, a determination is made whether a positive file override can be made. That is, a host, server, check-cashing administrative entity, or another administrative entity can utilize on line access to a "Positive Pay" file that verifies whether specific checks, based on the full MICR data, are legitimate payroll checks and whether they have been cashed. If the transaction is eligible for override and enough positive file history exists, then the transaction is given a positive file approval. Check transactions that exceed the risk assessment guidelines are subject to override by the positive history file. As previously mentioned in 245 in FIG. 2, a "Positive Pay" file is a record of a payroll check that has been cashed for a consumer. That record, given a sufficient period of time, does not return unpaid, and may be added to a "Positive Pay" file. With the checking account number being the index, any consumer presenting a check with that same account number could potentially benefit from that positive record. This positive file is established by a consumer's positive check writing history and is indexed by their identification and full MICR numbers. There are certain minimum criteria that are necessary to be placed on the positive file.

If a positive file override is not determined, then the "NO" branch is followed to 440, in which the check is declined, and the transaction is cancelled. If a transaction is not eligible to be overridden by the positive file, then it is declined. Note that all check transactions that have a validity error, or have a hit on the negative file are declined. A message is sent from host, server, check-cashing administrative entity, or another administrative entity to the kiosk to display the FCRA Adverse Action Amendment information and a phone number for the consumer to receive a more detailed explanation of the decline.

However, returning to decision block 435, if a positive file override is determined, then the "YES" branch is followed to 430. As described above, the consumer's check is approved, and the consumer can receive a disbursement of funds. Just as with any approval, the positive file approval will cause the host, server, check-cashing administrative entity, or another administrative entity to send a message to the kiosk to display the "We Owe You" screen, where the consumer chooses how the proceeds of the transaction will be disbursed.

Once a consumer's check is approved by one or more of above methods and/or routines, funds must be disbursed to the consumer presenting the check for cashing and the check must be settled. Another aspect of the embodiments of the invention described above include the settlement methods described below. Several procedures have been developed to settle finds. The procedures described below are intended to be examples of settlement methods and other procedures may exists in accordance with the invention.

An armored car service will ordinarily perform replenishment functions at one or more kiosks on a scheduled basis. One of those functions is to remove the cashed checks from the machine and complete the disposition. That disposition can include preparing the checks for deposit and depositing them in a local bank associated with a check-cashing administrative entity. Alternatively, the check-cashing administrative entity can prepare a remote deposit of the cashed checks. This remote process can take place in several ways.

One remote deposit method is to print out an imaged copy, front and back, of the cashed checks for each day. This is accomplished by querying a transactional database for all check transactions in a given day. That database contains the reference number for each check image. That reference number represents the index of that image on an image server associated with the check-cashing administrative entity. A file of those transactions is created with specific cut-off times and a call is made to the imaging server, using the reference number, to retrieve the images. That file of checks, along with the associated images, are sent each day by File Transfer Protocol (FTP). The check is printed on check stock. This process is performed using a triplex printer arrangement. One printer prints the front of the check, the next printer prints the back of the check and a third printer prints the MICR line in MICR ink below the check image.

Another remote deposit method is to print paper drafts for the deposited checks. This method can be used, for example, if a check image cannot be retrieved, or if there is an error in printing a specific check or check file. In this method, the check-cashing administrative entity can accesses the transactional database, which contains all of the information to print a paper draft for personal checks. For some check types it may be necessary to obtain the name of the maker on the check. Imaging character recognition software extracts that data systemically for the check-cashing administrative entity and ties that name to the paper draft print file. That print file is also sent by FTP each day. If the imaging character recognition software fails to identify the check's maker name with a high level of confidence, then the transaction is referred to a queue, where an associated agent views the image of the front of the check with a graphical user interface (GUI) to enter the maker name and address. The data necessary for the paper draft can include the member's name, check amount, check date, bank name, bank address, check number and maker name and address. The bank name and address is obtained by filtering the ABA number through a bank file that ties the ABA number to a bank name and address.

A third type of check-cashing settlement method available to a check-cashing administrative entity is electronic debit through an automated clearinghouse (ACH). The check-cashing administrative entity again uses that same transactional database to provide the necessary ACH data to perform the transaction. That data can include the full MICR number, the date of the check, the amount of the check, the check number and the check type. The check type may be necessary to determine what ACH code to use for the debit. Each transaction runs through an ACH filter. This filter utilizes a current file of ACH scrubbing data. That data corrects bank routing numbers and advises the check-cashing administrative entity when ACH settlement is not an option with a specific financial institution. A final ACH file generates and the check-cashing administrative entity initiates the transaction through the Federal Reserve.

While the above description contains many specifics, these specifics should not be construed as limitations on the scope of the invention, but merely as examples of at least one of the disclosed embodiments. Those skilled in the art will envision many other possible variations that are within the scope and spirit of the invention.

We claim:

1. A system for facilitating a check-cashing transaction, the system comprising:
   a. a check-cashing apparatus comprising:
      i. one or more input devices for receiving check data and identification data from a user;
      ii. a check scanner for capturing an image of a check presented by the user, the image comprising one or more data fields;
   b. a host system remotely-located from and in communication with the check-cashing apparatus, the host system comprising one or more processors configured to:
      i. receive the check data, identification data, and check image;
      ii. authenticate the check data by:
         1. converting one or more of the data fields of the check image into a format capable of being processed; and
         2. comparing the converted data fields to the check data input by the user;
      iii. determine automatically whether to approve the check by applying one or more risk assessment guidelines using the identification data and check data; and
      iv. upon approval of the check, provide a signal to the check-cashing apparatus to dispense cash.

2. The system of claim 1, wherein the process for authenticating the check data further comprises the step of calculating a score for each data field based on a probability that the converted data from the check image matches the check data input by the user.

3. The system of claim 2, wherein the process for authenticating the check data further comprises the step of applying an image filter to the transaction based upon one or more of the data field scores, the filter comprising criteria for determining if the check data is valid.

4. The system of claim 3, wherein one of the one or more data fields of the check image is a courtesy amount and the image filter criteria comprises a threshold probability that the courtesy amount of the check image matches check data input by the user.

5. The system of claim 3, wherein the one or more processors are further configured to transfer the transaction for manual review if the transaction fails the image filter.

6. The system of claim 1, wherein the data fields of the check image comprise data items selected from the group consisting of: legal amount, courtesy amount, payee, signature, endorsement, date and check type.

7. The system of claim 1, wherein the one or more input devices comprise a keyboard, an identification card reader, and a check reader.

8. The system of claim 1, wherein the one or more processors are further configured to authenticate the identification data by applying one or more validation algorithms to the identification data.

9. The system of claim 8, wherein the identification data comprises a driver's license number and wherein the one or more algorithms is based on coding of name or date of birth information into the driver's license number.

10. The system of claim 1, wherein the one or more processors are further configured authenticate the identification data by cross-referencing the data against one or more databases containing validated identification information.

11. The system of claim 1, wherein the application of each risk assessment guideline produces a factor score, and the one or more processors are further configured to approve the check by:
   a. calculating a cumulative score which is a function of the amalgamation of each of the factor scores; and
   b. determining whether to approve check based upon the cumulative score.

12. The system of claim 1, wherein the check-cashing apparatus further comprises a device for capturing biometric information of the user, and wherein the one or more processors are further configured to authenticate the identification data by comparing biometric information captured at the time of the transaction with stored biometric information relating to the user.

13. A system for facilitating a check-cashing transaction, the system comprising:
   a. a check-cashing apparatus comprising one or more input devices for receiving check data and identification data from a user;
   b. a host system remotely-located from and in communication with the check-cashing apparatus, the host system comprising one or more processors configured to:
      i. receive the check data and identification data;
      ii. authenticate the identification data by applying one or more validation algorithms to the identification data;
      iii. determine automatically whether to approve the check by applying one or more risk assessment guidelines using the identification data and check data; and
      iv. upon approval of the check, provide a signal to the check-cashing apparatus to dispense cash.

14. The system of claim 13, wherein the identification data comprises a driver's license number and wherein the one or more algorithms is based on coding of name or date of birth information into the driver's license number.

15. The system of claim 13, wherein the one or more input devices comprise a keyboard, an identification card reader, and a check reader.

16. The system of claim 13, wherein the one or more processors are further configured to authenticate the identification data by cross-referencing the data against one or more databases containing validated identification information.

17. The system of claim 13, wherein:
   a. the check-cashing apparatus further comprises a check scanner for capturing an image of the check, the image comprising one or more data fields; and
   b. the one or more processors are further configured to:
      i. receive the check image; and
      ii. authenticate the check data by:
         1. converting one or more of the data fields of the check image into a format capable of being processed; and
         2. comparing the converted data fields to the check data input by the user.

18. The system of claim 13, wherein the application of each risk assessment guideline produces a factor score, and the one or more processors are further configured to approve the check by:
   a. calculating a cumulative score which is a function of the amalgamation of the factor scores; and
   b. determining whether to approve check based upon the cumulative score.

19. The system of claim 13, wherein the check-cashing apparatus further comprises a device for capturing biometric information of the user, and wherein the one or more processors are further configured to authenticate the identification data by comparing biometric information captured at the time of the transaction with stored biometric information relating to the user.

20. A system for facilitating a check-cashing transaction, the system comprising:
   a. a check-cashing apparatus comprising one or more input devices for receiving check data and identification data from a user;
   b. a host system remotely-located from and in communication with the check-cashing apparatus, the host system comprising one or more processors configured to:
      i. receive the check data and identification data;
      ii. determine automatically whether to approve the check by:
         1. applying a plurality of risk assessment guidelines, wherein the application of each guidelines produces a factor score;
         2. calculating a cumulative score which is a function of the amalgamation the factor scores; and
         3. determining whether to approve check based upon the cumulative score; and
      iii. upon approval of the check, provide a signal to the check-cashing apparatus to dispense cash.

21. The system of claim 20, wherein the one or more input devices comprise a keyboard, an identification card reader, and a check reader.

22. The system of claim 20, wherein the one or more processors are further configured to authenticate the identification data by applying one or more validation algorithms to the identification data.

23. The system of claim 22, wherein the identification data comprises a driver's license number and wherein the one or more algorithms is based on coding of name or date of birth information into the driver's license number.

24. The system of claim 20, wherein the one or more processors are configured authenticate the identification data by cross-referencing the data against one or more databases containing validated identification information.

25. The system of claim 20, wherein:
   a. the check-cashing apparatus further comprises a check scanner for capturing an image of the check, the image comprising one or more data fields; and
   b. the one or more processors are further configured to:
      i. receive the check image; and
      ii. authenticate the check data by:
         1. converting one or more of the data fields of the check image into a format capable of being processed; and
         2. comparing the converted data fields to the check data input by the user.

26. The system of claim 20, wherein the check-cashing apparatus further comprises a device for capturing biometric information of the user, and wherein the one or more processors are further configured to authenticate the identification data by comparing biometric information captured at the time of the transaction with stored biometric information relating to the user.

27. A system for facilitating a check-cashing transaction, the system comprising:
   a. a check-cashing apparatus comprising:
      i. one or more input devices for receiving check data and identification data from a user, wherein the identification data comprises a driver's license number; and
      ii. a check scanner for capturing an image of a check presented by the user, the image comprising one or more data fields;
   b. a host system remotely-located from and in communication with the check-cashing apparatus, the host system comprising one or more processors configured to:
      i. receive the check data, identification data, and check image;
      ii. authenticate the identification data by applying a validation algorithm to the identification data based on coding of name or date of birth information into the driver's license number;
      iii. authenticate the check data by:
         1. converting one or more of the data fields of the check image into a format capable of being processed;
         2. comparing the converted data fields to the check data input by the user;
         3. calculating a score for each data field based on a probability that the converted data from the check image matches the check data input by the user; and
         4. applying an image filter to the transaction based upon one or more of the data field scores, the filter comprising criteria for determining if the check data is valid;
      iv. if the transaction fails the image filter, transfer the transaction for manual review;
      v. if the transaction passes the image filter, determine automatically whether to approve the check by:
         1. applying a plurality of risk assessment guidelines, wherein the application of each guidelines produces a factor score;
         2. calculating a cumulative score which is a function of the amalgamation of the factor scores; and
         3. determining whether to approve check based upon the cumulative score; and
      vi. upon approval of the check, provide a signal to the check-cashing apparatus to dispense cash.

28. A system for facilitating a check-cashing transaction, the system comprising:
  a. a check-cashing apparatus comprising one or more input devices for receiving check data, identification data, and membership data from a user;
  b. a host system remotely-located from and in communication with the check-cashing apparatus, the host system comprising a membership database and one or more processors configured to:
    i. receive the check data and identification data;
    ii. determine if the user is an existing member by cross-referencing the identification data against the membership database;
    iii. initiate a membership application process if the user is not an existing member, the membership application process comprising:
      1. prompting the check-cashing apparatus to query the user for membership data;
      2. receiving the membership data input by the user, wherein the membership data comprises demographic data relating to the user;
      3. authenticating the demographic data by cross-referencing the demographic data against one or more databases containing validated demographic information; and
      4. upon authentication of the demographic data, establishing a membership for the user and storing the membership data in the membership database;
    iv. if the user is an existing member or has established membership, determine automatically whether to approve the check by applying one or more risk assessment guidelines using the identification data and check data; and
    v. upon approval of the check, provide a signal to the check-cashing apparatus to dispense cash.

29. The system of claim 28, wherein the check-cashing apparatus further comprises a device for capturing biometric information of the user, and wherein the membership data further comprises biometric data captured by the biometric data capture device.

30. The system of claim 29, wherein the one or more processors are further configured to authenticate the identification data by comparing biometric information captured at the time of the transaction with stored biometric information relating to the user.

31. The system of claim 28, wherein the one or more input devices comprises a card reader.

32. The system of claim 31, wherein the demographic data is extracted from a driver's license or identification card inserted by the user into the card reader.

33. A method for facilitating an automated check-cashing transaction, the method comprising:
  a. receiving check data and identification data from a user;
  b. capturing an image of a check presented by the user, the image comprising one or more data fields;
  c. authenticating the check data by:
    i. converting one or more of the data fields of the check image into a format capable of being processed; and
    ii. comparing the converted data fields to the check data input by the user;
  d. upon authentication of the check data, automatically determining whether to approve the check by applying one or more risk assessment guidelines using the identification data and check data; and
  e. upon approval of the check, dispensing cash to the user.

34. The method of claim 33, wherein the process for authenticating the check data further comprises calculating a score for each data field based on a probability that the converted data from the check image matches the check data input by the user.

35. The method of claim 34, wherein the process for authenticating the check data further comprises applying an image filter to the transaction based upon one or more of the data field scores, the filter comprising criteria for determining if the check data is valid.

36. The method of claim 35, wherein one of the one or more data fields of the check image is a courtesy amount and the image filter criteria comprises a threshold probability that the courtesy amount of the check image matches check data input by the user.

37. The method of claim 35, further comprising the step of transferring the transaction for manual review if the transaction fails the image filter.

38. The method of claim 33, wherein the data fields of the check image comprise data items selected from the group consisting of: legal amount, courtesy amount, payee, signature, endorsement, date and check type.

39. The method of claim 33, further comprising the step of authenticating the identification data by applying one or more validation algorithms to the identification data.

40. The method of claim 39, wherein the identification data comprises a driver's license number and wherein the one or more algorithms is based on coding of name or date of birth information into the driver's license number.

41. The method of claim 33, further comprising the step of authenticating the identification data by cross-referencing the data against one or more databases containing validated identification information.

42. The method of claim 33, wherein the application of each risk assessment guideline produces a factor score, and the step of determining whether to approve the check comprises:
  a. calculating a cumulative score which is a function of the amalgamation of each of the factor scores; and
  b. determining whether to approve check based upon the cumulative score.

43. The method of claim 33, further comprising:
  a. capturing biometric information of the user at the time of the transaction;
  b. authenticating the identification data by comparing the biometric information captured at the time of the transaction with stored biometric information relating to the user.

44. A method for facilitating an automated check-cashing transaction, the method comprising:
  a. receiving check data and identification data from a user;
  b. authenticating the identification data by applying one or more validation algorithms to the identification data;
  c. upon authentication of the identification data, determining automatically whether to approve the check by applying one or more risk assessment guidelines using the identification data and check data; and
  d. upon approval of the check, dispensing cash to the user.

45. The method of claim 44, wherein the identification data comprises a driver's license number and wherein the one or more algorithms is based on coding of name or date of birth information into the driver's license number.

46. The method of claim 44, further comprising authenticating the identification data by cross-referencing the data against one or more databases containing validated identification information.

47. The method of claim 44, further comprising:
  a. capturing an image of the check, the image comprising one or more data fields; and
  b. authenticating the check data by:
    i. converting one or more of the data fields of the check image into a format capable of being processed; and
    ii. comparing the converted data fields to the check data input by the user.

48. The method of claim 44, wherein the application of each risk assessment guideline produces a factor score, the process of determining whether to approve the check comprising:
  a. calculating a cumulative score which is a function of the amalgamation of the factor scores; and
  b. determining whether to approve check based upon the cumulative score.

49. The method of claim 44, further comprising:
  a. capturing biometric information of the user at the time of the transaction, and
  b. authenticating the identification data by comparing the biometric information captured at the time of the transaction with stored biometric information relating to the user.

50. A method for facilitating an automated check-cashing transaction, the method comprising:
  a. receiving check data and identification data from a user;
  b. determining automatically whether to approve the check by:
    i. applying a plurality of risk assessment guidelines, wherein the application of each guidelines produces a factor score;
    ii. calculating a cumulative score which is a function of the amalgamation the factor scores; and
    iii. determining whether to approve check based upon the cumulative score; and
  c. upon approval of the check, provide a signal to the check-cashing apparatus to dispense cash.

51. The method of claim 50, further comprising authenticating the identification data by applying one or more validation algorithms to the identification data.

52. The method of claim 51, wherein the identification data comprises a driver's license number and wherein the one or more algorithms is based on coding of name or date of birth information into the driver's license number.

53. The method of claim 50, further comprising authenticating the identification data by cross-referencing the data against one or more databases containing validated identification information.

54. The method of claim 50, further comprising:
  a. capturing an image of the check, the image comprising one or more data fields; and
  b. authenticating the check data by:
    i. converting one or more of the data fields of the check image into a format capable of being processed; and
    ii. comparing the converted data fields to the check data input by the user.

55. The method of claim 50, further comprising:
  a. capturing biometric information of the user at the time of the transaction; and
  b. authenticating the identification data by comparing the biometric information captured at the time of the transaction with stored biometric information relating to the user.

56. A method for facilitating an automated check-cashing transaction, the method comprising:
  a. receiving check data and identification data from a user, wherein the identification data comprises a driver's license number;
  b. capturing an image of a check presented by the user, the image comprising one or more data fields;
  C. authenticating the identification data by applying a validation algorithm to the identification data based on coding of name or date of birth information into the driver's license number;
  d. authenticating the check data by:
    i. converting one or more of the data fields of the check image into a format capable of being processed;
    ii. comparing the converted data fields to the check data input by the user;
    iii. calculating a score for each data field based on a probability that the converted data from the check image matches the check data input by the user; and
    iv. applying an image filter to the transaction based upon one or more of the data field scores, the filter comprising criteria for determining if the check data is valid;
  e. if the transaction fails the image filter, transferring the transaction for manual review;
  f. if the transaction passes the image filter, determining automatically whether to approve the check by:
    i. applying a plurality of risk assessment guidelines, wherein the application of each guidelines produces a factor score;
    ii. calculating a cumulative score which is a function of the amalgamation of the factor scores; and
    iii. determining whether to approve check based upon the cumulative score; and
  g. dispensing cash upon approval of the check.

57. A method for facilitating an automated check-cashing transaction, the method comprising:
  a. receiving check data and identification data;
  b. determining if the user is an existing member by cross-referencing the identification data against the membership databases;
  c. initiating a membership application process if the user is not an existing member, the membership application process comprising:
    i. prompting the check-cashing apparatus to query the user for membership data;
    ii. receiving the membership data from the user, wherein the membership data comprises demographic data relating to the user;
    iii. authenticating the demographic data by cross-referencing the demographic data against one or more databases containing validated demographic information;
    iv. upon authentication of the demographic data, establishing a membership for the user and storing the membership data in the membership database;
  d. if the user is an existing member or has established membership, determining automatically whether to approve the check by applying one or more risk assessment guidelines using the identification data and check data; and
  e. dispensing cash upon approval of the check.

58. The method of claim 57, wherein the membership data further comprises biometric information of the user, and wherein the membership application process further comprises capturing and storing biometric information relating to the user.

59. The method of claim 58, further comprising capturing biometric information of the user at the time of the transaction, and wherein the step of determining whether to approve the transaction further comprises the step of comparing stored biometric information captured during the membership process with biometric information captured at the time of the transaction.

60. The method of claim 57, wherein the demographic data is extracted from a driver's license or identification card.

* * * * *